(12) United States Patent
Gorelick et al.

(10) Patent No.: US 10,007,864 B1
(45) Date of Patent: Jun. 26, 2018

(54) IMAGE PROCESSING SYSTEM AND METHOD

(71) Applicant: Cloudera, inc., Palo Alto, CA (US)

(72) Inventors: Micha Gorelick, Brooklyn, NY (US);
Hilary Mason, Brooklyn, NY (US);
Grant Custer, Brroklyn, NY (US)

(73) Assignee: Cloudera, Inc., Palo Alto, CA (US)

( * ) Notice: Subject to any disclaimer, the term of this patent is extended or adjusted under 35 U.S.C. 154(b) by 0 days. days.

(21) Appl. No.: 15/891,969

(22) Filed: Feb. 8, 2018

Related U.S. Application Data

(63) Continuation of application No. 15/293,679, filed on Oct. 14, 2016, now Pat. No. 9,946,958.

(51) Int. Cl.
*G06K 9/62* (2006.01)
*G06K 9/72* (2006.01)
(Continued)

(52) U.S. Cl.
CPC ......... *G06K 9/6219* (2013.01); *G06F 17/277* (2013.01); *G06F 17/2818* (2013.01);
(Continued)

(58) Field of Classification Search
CPC .. G06K 9/6219; G06K 9/6215; G06K 9/6277; G06K 9/6296; G06K 9/72; G06K 9/6201; G06K 9/6267; G06K 9/6282; G06F 17/30268; G06F 17/3028; G06F 17/30684; G06F 17/30554; G06F 17/3002; G06F 17/30244; G06F 17/30946; G06F 21/6218; G06F 17/30598; G06F 17/277; G06F 17/2775; G06F 17/281; G06F 17/30221; G06T 2207/20016; G06T 2207/20081; G06T 3/0068; G06T 7/90; G06T 11/206; G06T 15/04; G06N 99/005; G06N 3/04
See application file for complete search history.

(56) References Cited

U.S. PATENT DOCUMENTS

| | | | | |
|---|---|---|---|---|
| 5,343,554 A | * | 8/1994 | Koza ...................... | G06N 3/126 706/13 |
| 5,870,735 A | * | 2/1999 | Agrawal ........... | G06F 17/30625 |

(Continued)

OTHER PUBLICATIONS

Al-Mubaid, et al., "A Cross-Cluster Approach for Measuring Semantic Similarity between Concepts," 2006 IEEE International Conference on Information Reuse & Integration, pp. 551-556 (2006).

(Continued)

*Primary Examiner* — Manav Seth
(74) *Attorney, Agent, or Firm* — Perkins Coie LLP

(57) ABSTRACT

An image processing system involves a camera, at least one processor associated with the camera, non-transitory storage, a lexical database of terms and image classification software. The image processing system uses the image classification software to assign hyponyms and associated probabilities to an image and then builds a subset hierarchical tree of hypernyms from the lexical database of terms. The processor then scores the hypernyms and identifies at least one hypernym for the image that has a score that is calculated to have a value that is greater than one of: a pre-specified threshold score, or all other calculated level scores within the subset hierarchical tree. The associated methods are also disclosed.

23 Claims, 9 Drawing Sheets

(51) Int. Cl.
*G06F 17/30* (2006.01)
*G06F 17/28* (2006.01)
*G06F 17/27* (2006.01)

(52) U.S. Cl.
CPC ...... *G06F 17/3002* (2013.01); *G06F 17/3028* (2013.01); *G06F 17/30244* (2013.01); *G06F 17/30268* (2013.01); *G06F 17/30598* (2013.01); *G06F 17/30684* (2013.01); *G06F 17/30946* (2013.01); *G06K 9/6201* (2013.01); *G06K 9/6215* (2013.01); *G06K 9/6277* (2013.01); *G06K 9/6296* (2013.01); *G06K 9/72* (2013.01)

(56) References Cited

U.S. PATENT DOCUMENTS

| | | | | |
|---|---|---|---|---|
| 5,899,992 A * | 5/1999 | Iyer | ................ | G06F 17/30625 |
| 6,026,388 A * | 2/2000 | Liddy | ................ | G06F 17/30654 |
| 6,061,675 A * | 5/2000 | Wical | ................ | G06F 17/271 |
| | | | | 704/10 |
| 6,393,427 B1 * | 5/2002 | Vu | ................ | G06F 17/30873 |
| | | | | 707/797 |
| 6,567,797 B1 * | 5/2003 | Schuetze | ................ | G06F 17/3061 |
| 6,751,354 B2 * | 6/2004 | Foote | ................ | G06K 9/00758 |
| | | | | 348/395.1 |
| 6,778,970 B2 * | 8/2004 | Au | ................ | G06F 17/2785 |
| | | | | 706/54 |
| 7,043,075 B2 * | 5/2006 | Gutta | ................ | G06K 9/6273 |
| | | | | 382/158 |
| 7,599,580 B2 * | 10/2009 | King | ................ | H04N 1/00244 |
| | | | | 382/306 |
| 7,693,683 B2 * | 4/2010 | Ihara | ................ | G06F 17/30321 |
| | | | | 702/179 |
| 7,702,596 B2 * | 4/2010 | Tu | ................ | G06K 9/6256 |
| | | | | 382/155 |
| 7,873,205 B2 * | 1/2011 | Okuda | ................ | G06K 9/6277 |
| | | | | 382/141 |
| 7,904,455 B2 * | 3/2011 | Chiu | ................ | G06F 17/30265 |
| | | | | 382/224 |
| 7,953,693 B2 * | 5/2011 | Smith | ................ | G06K 9/6292 |
| | | | | 706/52 |
| 7,996,762 B2 * | 8/2011 | Qi | ................ | G06K 9/00711 |
| | | | | 715/233 |
| 8,107,726 B2 * | 1/2012 | Xu | ................ | G06K 9/6256 |
| | | | | 345/619 |
| 8,145,677 B2 * | 3/2012 | Al-Shameri | ...... | G06F 17/30333 |
| | | | | 707/802 |
| 8,331,699 B2 * | 12/2012 | Dewan | ................ | G06K 9/6209 |
| | | | | 382/159 |
| 9,053,392 B2 * | 6/2015 | Yang | ................ | G06K 9/6267 |
| 9,111,146 B2 * | 8/2015 | Dunlop | ................ | G06K 9/00718 |
| 2002/0126143 A1 * | 9/2002 | Bae | ................ | G06F 3/0485 |
| | | | | 715/723 |
| 2008/0092111 A1 * | 4/2008 | Kinnucan | ................ | G06F 8/10 |
| | | | | 717/105 |

OTHER PUBLICATIONS

Jiang, et al., "Semantic Similarity Based on Corpus Statistics and Lexical Taxonomy," Proc. of Int'l Conf. Research on Computational Linguistics, Taiwan (1997).

Krizhevsky, et al., "ImageNet Classification with Deep Convolutional Neural Networks", Advances in neural information processing systems, pp. 1097-1105 (2012) accessed Mar. 2018 at https://papers.nips.cc/paper/4824-imagenet-classification-with-deep-convolutional-neural-networks; 9 pages.

Leacock, et al., "Combining Local Context and WordNet Similarity for Word Sense Identification," Ch. 11, pp. 265-283; MIT Press, Cambridge, MA (1998).

Lin, D., "An Information-Theoretic Definition of Similarity," Proc. 15th Int'l Conf. on Machine Learning, pp. 296-304, San Francisco, CA (1998).

Resnik, P., "Using Information Content to Evaluate Semantic Similarity in a Taxonomy," Int'l Joint Conf. on Artificial Intelligence (IJCAI-95), pp. 448-453, Montreal, Canada (1995).

Szegedy, et al., "Going deeper with convolutions," arXiv:1409.4842v1 [cs.CV] Sep. 17, 2014; accessed Mar. 28, 2018 at https://arxiv.org/abs/1409.4842?spm=5176.100239.blogcont78726.30.A1YKhD&file=1409.4842, 12 pages.

Szegedy, et al., "Rethinking the Inception Architecture for Computer Vision," arXiv:1512.00567v1 [cs.CV] Dec. 2, 2015; accessed Mar. 28, 2018 at https://www.arxiv.org/pdf/1512.00567v1.pdf , 10 pages.

Wu et al., "Verb Semantics and Lexical Selectin," 32nd Annual Meeting of the Assoc. for Computational Linguistics, pp. 133-138 (1994).

* cited by examiner

IMAGE PROCESSING SYSTEM AND METHOD

CROSS-REFERENCE TO RELATED APPLICATION(S)

This application is a continuation of U.S. patent application Ser. No. 15/293,679, filed Oct. 14, 2016, and entitled IMAGE PROCESSING SYSTEM AND METHOD, which is incorporated herein by reference in its entirety.

TECHNICAL FIELD

This disclosure relates generally to computing and, more particularly, to computerized image processing.

BACKGROUND

The advent of digital photography has dramatically reduced the cost of taking photographic images relative to using film. As a result, taking hundreds or even thousands of pictures is extremely easy and cost effective.

However, that ability has a down side in that it takes longer for a human to view and isolate those pictures that may be of interest for some reason.

Attempts have been made to sort/group images using output from classification software such as GoogLeNet. However, such sorting is typically not accurate enough for use in certain research applications, such as identification/discovery/classification of new land and marine creatures, because the output probabilities are often extremely low, so significant human effort in sorting/grouping the images is still required.

So, there is still a need for more accurate image processing than is currently available.

SUMMARY

We have devised a system and approach that represents an improvement to the field of computerized image processing.

Advantageously, our solution is broadly suitable for use with any application for which there is a hierarchical taxonomy available, for example in biology—Life, Domain, Kingdom, Phylum, Class, Order, Family, Genus, Species, Sub-species, and for which a set of images is also available where each image in the set is annotated by one or more of the labels at a most specific level of the taxonomy (e.g., grey wolf, basset hound, Indian elephant, etc.).

One aspect of this disclosure involves an image processing system. The image processing system includes a camera, at least one processor associated with the camera, non-transitory storage, associated with the camera and accessible to the processor. The non-transitory storage has therein, at least an image obtained via the camera, and programming executable by the at least one processor.

The image processing system also includes a lexical database of terms that is accessible to the processor. The lexical database of terms is arranged in a hierarchy including a single root node, multiple leaf nodes, and multiple hypernym nodes, located between the root node and at least one leaf node and is further arranged such that an individual hypernym node will have either: the root node or another hypernym node as a parent node, and at least one leaf node or hypernym node as a child node. In addition, the root node is associated with a term in the hierarchy of greatest generality. Also, each of the leaf nodes has an associated hyponym term, the hyponym terms representing terms in the hierarchy of greatest specificity, and each of the hypernym nodes is associated with a term that is more specific than its parent node and less specific than each of its child nodes. Finally, each of the hyponym terms has an assigned value between 0 and 1.

The image processing system additionally includes image classification software which, when executed by the at least one processor will classify the image, using contents of a visual database having multiple images therein with each of the images having at least one hyponym from the lexical database of terms associated with it so as to assign to the image at least two hyponym terms and a specific probability value representing a probability that each of the at least two hyponym terms accurately describes content of the image.

When the programming is executed by the at least one processor, the processor will, for the image: i) build a subset hierarchical tree, from the lexical database of terms, containing the assigned at least two hyponym terms, all hyponym terms sharing a common parent with the assigned at least two hyponym terms, and all hypernyms within the hierarchy between the at least two hyponyms and the root node; ii) calculate a first level score for each hypernym in the subset hierarchical tree, that is a first level hypernym because it is directly connected to a leaf node, using a specified scoring function and the assigned specific probability value for each hyponym; iii) calculate a second level score for each hypernym that is a second level hypernym, because it is directly connected to at least one first level hypernym, using first level scores of its child nodes in the specified scoring function; iv) calculate additional level scores for each additional level of parent hypernyms that are above the second level hypernyms using calculated scores for all immediate child hypernyms of each parent hypernym in the specified scoring function; and v) identify at least one hypernym for the image, the at least one hypernym being a hypernym associated with a node, other than the root node, that has a specific level score that is calculated to have a value that is greater than one of: a pre-specified threshold score, or all other calculated level scores within the subset hierarchical tree.

Another aspect of this disclosure involves an image processing method that uses a processor to perform: A) classifying an image, taken using a camera, using contents of a visual database, stored in non-transitory storage, having multiple images therein with each of the images having at least one hyponym corresponding to a leaf node of a hierarchically-organized lexical database of terms associated with it, by assigning to the image at least two hyponym terms and a specific probability value for each representing a probability that each of the at least two hyponym terms accurately describes content of the image; B) building a subset hierarchical tree from the hierarchically-organized lexical database of terms, the subset hierarchical tree containing the assigned at least two hyponym terms, all hyponym terms in the hierarchically-organized lexical database of terms sharing a common parent with the assigned at least two hyponym terms, and all hypernyms within the hierarchically-organized lexical database of terms connected between the at least two hyponyms and the root node; C) calculating a first level score, using a specified scoring function and the assigned specific probability value for each hyponym, for each hypernym in the subset hierarchical tree that is a first level hypernym because it is directly connected to a leaf node; D) calculating a second level score for each hypernym that is a second level hypernym, because it is directly connected to at least one first level hypernym, using first level scores of its child nodes in the specified scoring function; E) calculating additional level scores for each additional level of parent hypernyms that are above the second level hypernyms using calculated scores for all immediate child hypernyms of each parent hypernym in the specified scoring function; F) identifying at least one hypernym for the image, the at least one hypernym being a hypernym associated with a node, other than the root node, that has a specific level score that is calculated to have a value that is greater than one of: a pre-specified threshold score, or all other calculated level scores within the subset hierarchical tree; and G) linking the at least one identified hypernym to the image so that, in response to a user query that identifies the at least one identified hypernym, the image will be retrieved for the user in response to the query.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems inherent with current computer image processing for purposes of sorting and/or grouping of images. Our technical solution improves the functioning of computer systems that are constructed to perform those types of operations by improving the accuracy and thereby making them more suitable for use in identification/discovery/classification of new land and marine creatures by addressing a problem that only arises in the image processing art. Still; further, the systems and methods described herein are particularly well suited for use with autonomous exploration vehicles, for example, autonomous underwater vehicles (e.g., mini submarines), small autonomous land vehicles, or autonomous aerial vehicles (e.g., drones, UAVs) that can be sent out to explore a region and take many thousands of pictures (e.g., still images or significant frames from video) for purposes of, for example, new creature discovery and identification. Finally, systems and methods embodying the teachings described herein make unconventional use of existing technology in order to make such activities more viable than is possible with the existing technology itself.

Figure 1:
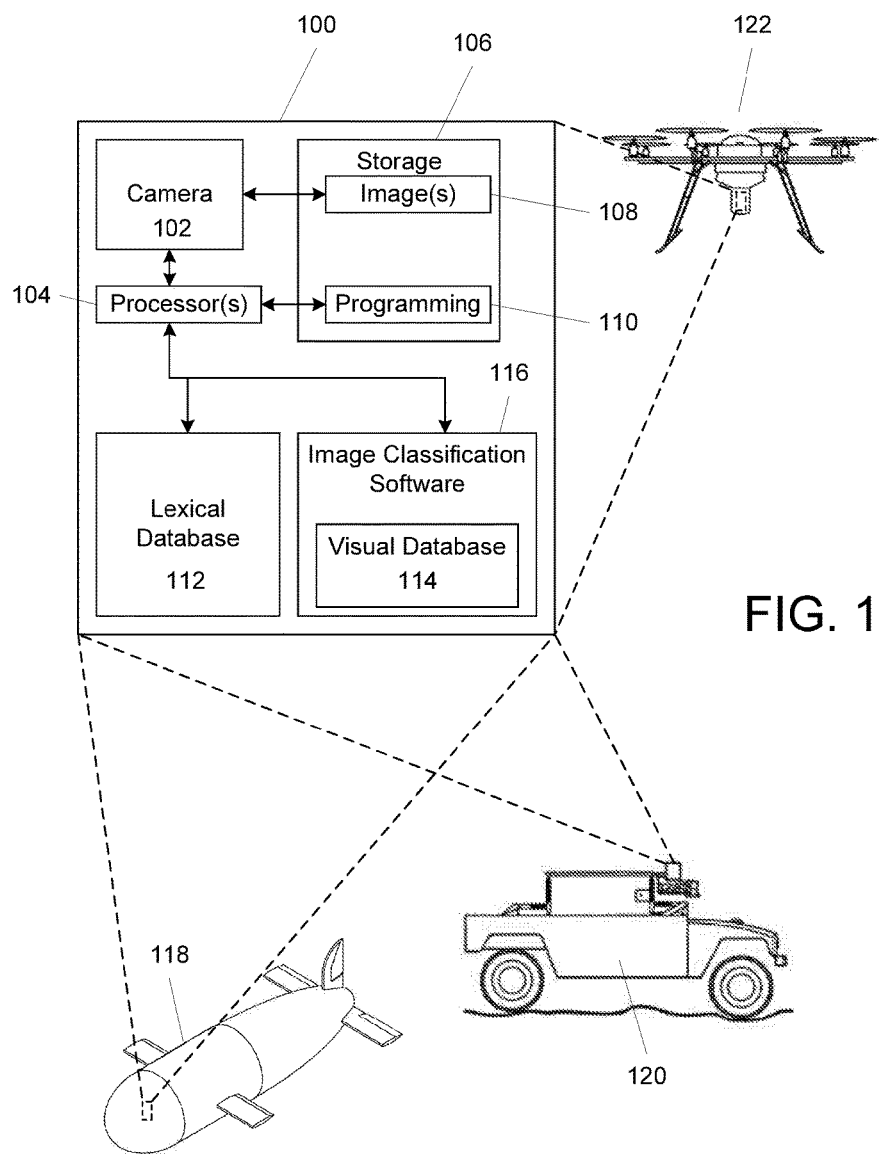
FIG. 1 illustrates, in simplified form, one example variant implementation of our image processing system solution along with three suitable implementation environments.

FIG. 1 illustrates, in simplified form, one example variant implementation of our image processing system 100 solution along with three suitable implementation environments.

As shown in FIG. 1, the image processing system is made up of a camera 102, at least one processor 104, associated with the camera 102, and storage 106 configured to store at least images 108 and programming 110 that is executable by the processor(s) 104 to effect the operation(s) described herein.

At this point it should be noted that, unless otherwise expressly stated herein, the term "storage" as used herein is intended to mean any storage medium that stores data, data-containing structures, and program instructions in a non-transitory manner, for example, such as non-transient solid state memory, a magnetic hard drive, a CD or DVD, a tape drive, or an analogous or equivalent storage medium type would.

Returning to FIG. 1, the image processing system further includes a lexical database 112 and image classification software 116 based upon, or that makes use of, a visual database 114 as described herein.

The lexical database 112 is a hierarchically arranged taxonomy of terms, which at its most generic is a single root node, for example, "entity" or "life" and then a series of nodes, having associated terms, arranged in a hierarchical manner to represent immediate subgroups of the respective node's parent node. In addition, the hierarchy should ideally have a single root node, but need not be balanced (i.e., the number of nodes between the root node and each leaf need not be the same within the hierarchy). If the hierarchy does not have a single root node, it must be able to be broken up by treating each root node as the only root node.

For example, using the biological taxonomy, "Life" is the root node, and it has multiple child nodes, the "Domain" nodes, each of which, in turn has multiple "Kingdom" nodes, and the same is true for "Phylum" nodes, "Class" nodes, "Order" nodes, "Family" nodes, "Genus" nodes, "Species" nodes, each having one or more "Subspecies" nodes. The lowest level nodes (e.g., subspecies) are referred to herein as "leaf" node. Each of these nodes has a lexical term (i.e., word or phrase) associated with it, with the lexical terms for the leaf nodes being referred to as "hyponyms" herein and the terms associated with nodes between the leaf nodes and the root node are referred to as "hypernyms" herein. Examples of some lexical databases suitable for use with embodiments of the image processing system 100 described herein include, but are not limited to:

WordNet (https://wordnet.princeton.edu/),
BabelNet (http://babelnet.org/),
eXtended WordNet (http://www.hlt.utdallas.edu/~xwn/),
FrameNet (https://framenet.icsi.berkeley.edu/fndrupal/)
FrameNet foreign counterparts
    http://sccfn.sxu.edu.cn/portal-en/home.aspx
    http://www.ufjf.br/framenetbr/
    https://spraakbanken.gu.se/eng/swefn/
    http://jfn.st.hc.keio.ac.jp/
    http://www.ramki.uw.edu.pl/en/index.html
    http://framenet.dk/
    http://www.laits.utexas.edu/gframenet/
Malayalam WordNet (http://malayalamwordnet.cu sat.ac.in/),
Chinese Wordnet (http://lope.linguistics.ntu.edu.tw/cwn/),
WordNet Libre du Français (http://alpage.inria.fr/~sagot/wolf.html),
IndoWordNet (http://www.cfilt.iitb.ac.in/indowordnet/),
MultiWordNet (http://multiwordnet.fbk.eu/english/home.php),
EuroWordNet (http://www.illc.uva.nl/EuroWordNet/),
Global Wordnet (http://globalwordnet.org/),
BalkaNet (http://www.dblab.upatras.gr/balkanet/),
RussNet (http://project.phil.spbu.ru/RussNet/),
FinnWordNet (http://www.ling.helsinki.fi/en/lt/research/finnwordnet/),
GermaNet (http://www.sfs.uni-tuebingen.de/lsd/index.shtml),
OpenWN-PT (https://github.com/own-pt/openWordnet-PT),
plWordNet (http://plwordnet.pwr.wroc.pl/wordnet/),
PolNet (http://ltc.amu.edu.pl/polnet/), and
BulNet (http://dcl.bas.bg/bulnet/)
to name a few.

The visual database 114 is a database of images, with each of the images in it associated with at least one leaf node's hyponym from the schema of the particular lexical database 112. One representative example of such a visual database 114 is ImageNet (available from http://image-net.org/) which is a visual database organized according to the WordNet lexical database hierarchy such that all images in ImageNet are labeled/tagged (i.e., associated) with at least one leaf term from WordNet.

The image classification software 116 is a deep neural network program constructed according to an architecture such as, for example, GoogLeNet and its Inception module (described in C. Szegedy, et al., "Going deeper with convolutions" arXiv:1409.4842 (2014), and C. Szegedy, et al., "Rethinking the Inception Architecture for Computer Vision" arXiv:1512.00567 (2015), program available from http://vision.princeton.edu/pvt/GoogLeNet/), or using an architecture such as AlexNet (described in A. Krizhevsky, et al., "Imagenet classification with deep convolutional neural networks" Advances in neural information processing systems, pp. 1097-1105 (2012)), to classify images. In addition, the visual database 114 is used by the image classification software 116, in some cases, both as a training base to classify a new image.

With respect to the image processing system 100 described herein, the image classification software 116 is suitable for use if it will assign to each image it classifies:
    (a) at least one hyponym from the leaf nodes of the lexical database 112, and
    (b) a probability value between 0 and 1 to each assigned hyponym.

Advantageously, the image processing system 100 of FIG. 1 can be entirely housed, for purposes of exploration-related implementations, in, for example, an autonomous undersea vehicle 118 such as a mini-submarine, an autonomous land vehicle 120, or an autonomous aerial vehicle 122 such as a drone, UAV or mini-UAV.

Figure 2:
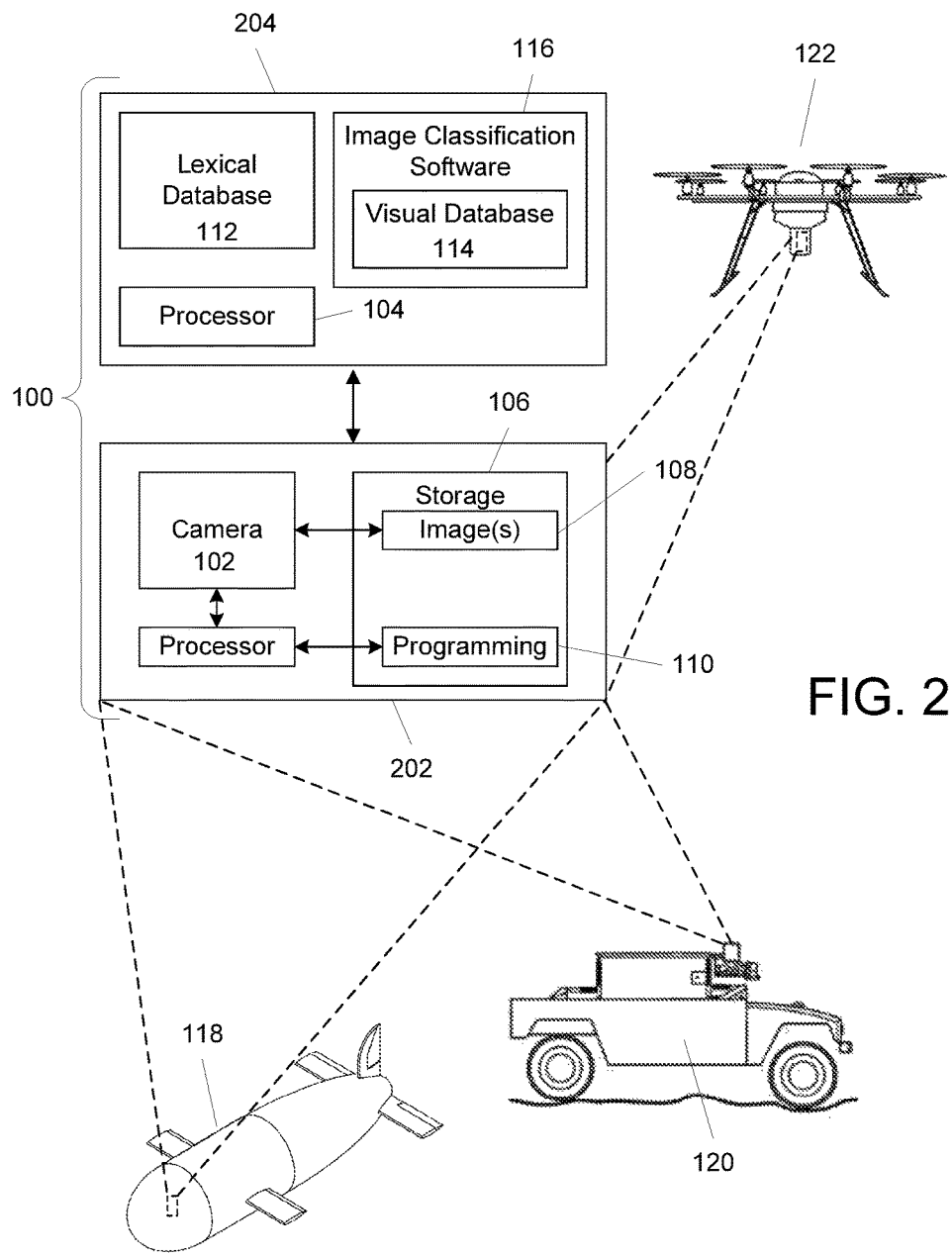
FIG. 2 illustrates, in simplified form, another example variant implementation of our image processing system solution for the three implementation environments of FIG. 1.

FIG. 2 illustrates, in simplified form, another example variant implementation of our image processing system 100 solution for the three implementation environments of FIG. 1. As shown in FIG. 2, the image processing system 100 is made up of the same components as that of FIG. 1. However, the with the implementation of FIG. 2, the camera 102, processor(s) 104 and storage 106 are part of an image acquisition unit 202 that is housed within the autonomous undersea vehicle 118, autonomous land vehicle 120 or autonomous aerial vehicle 122, whereas the lexical database 112 and image classification software 116 (based upon the visual database 114) are part of a processing unit 204 that is located geographically remotely from the image acquisition unit 202, with the image acquisition unit 202 and processing unit 204 being communicatably connectable to each other 206, for example, via a wired or wireless connection, either remotely during image acquisition or when co-located somewhere post-image acquisition. As such, it should be understood that the processing unit 204 may have its own processor(s) 104 and/or the image acquisition unit 202 may not have processor(s) 104 that operate to perform any function described herein if the processing unit 204 does.

Figure 3:
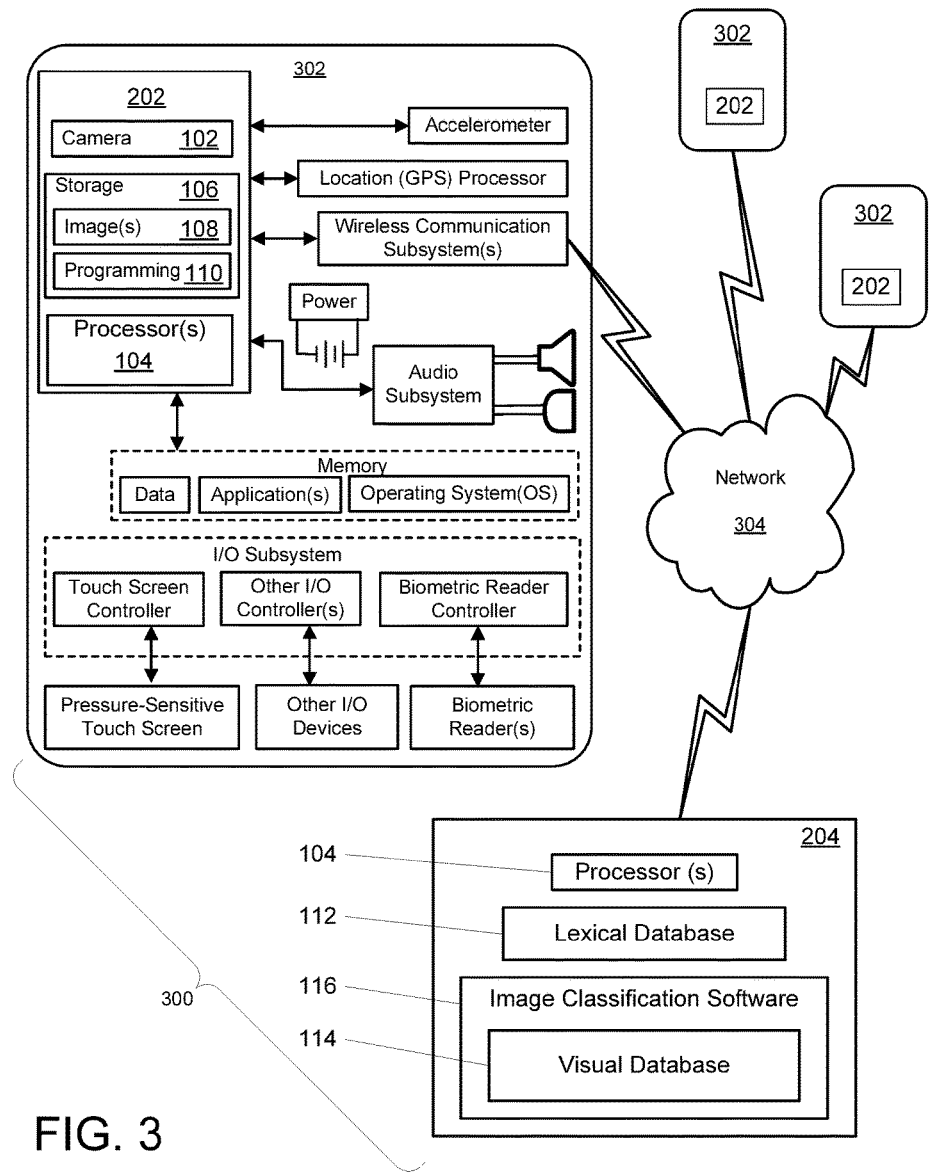
FIG. 3 illustrates, in simplified form, an alternative example variant of our image processing system similar to that of FIG. 2.

FIG. 3 illustrates, in simplified form, an alternative example variant 300 of our image processing system 100 similar to that of FIG. 2 in that it is made up of an image acquisition unit 202 and a processing unit 204. However, with this variant implementation, the image acquisition unit 202 is part of a game camera or trail camera (referred to herein as a "game/trail camera unit") 302 that can be moved about and/or situated in a particular location to acquire images, for example, continuously, or in response to some trigger, such as movement within the field of view of the camera 102. With this variant 300, the image acquisition unit 202 will typically be wirelessly connectable/connected to a remotely located processing unit 204 via a network 304 so that the processing unit 204 can be shared by multiple, geographically dispersed devices containing their own image acquisition units 202.

Figure 4:
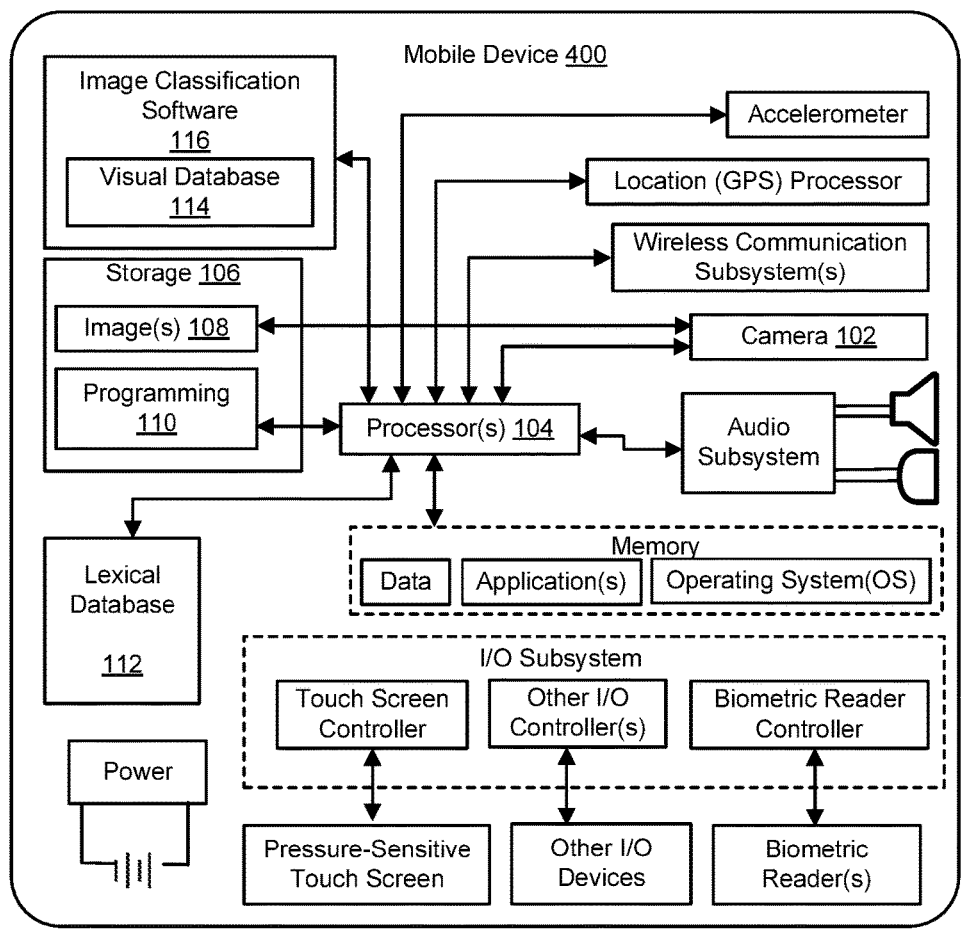
FIG. 4 illustrates, in simplified form, an alternative example variant of our image processing system similar to that of FIGS. 1-3.

FIG. 4 illustrates, in simplified form, an alternative example variant 400 of our image processing system 100 similar to that of FIGS. 1-3 except that the entire image processing system 100 is housed in a handheld mobile device 400, such as a smart phone, tablet or laptop computer.

Figure 5:
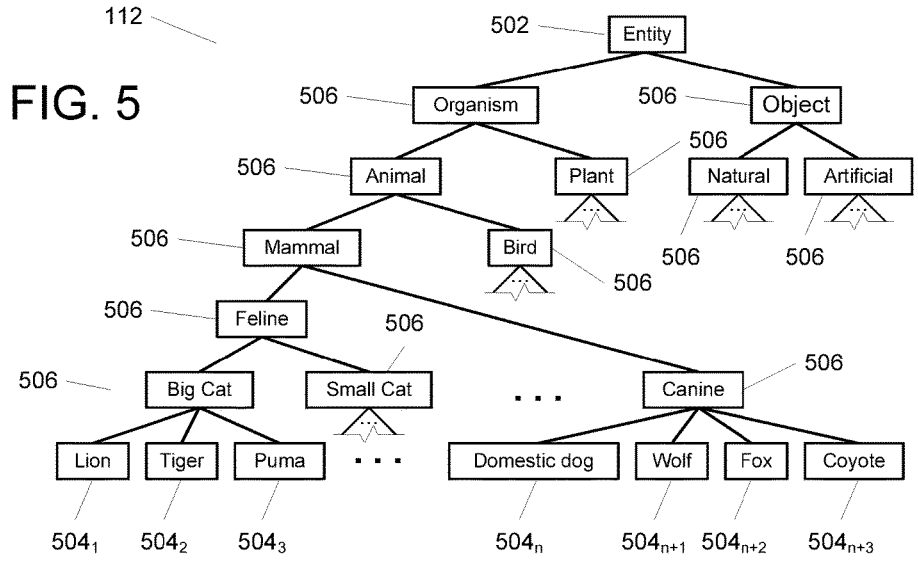
FIG. 5 illustrates in simplified form, one example of a lexical database.

FIG. 5 illustrates in simplified form, one example of a lexical database 112 suitable for use as described herein (only a portion of which is shown for simplicity). As shown, the lexical database 112 is made up of a root node 502 at its "highest" part (meaning that it has no parent nodes) that has a term associated with it, in this case "Entity," which is the most general term that can be used to describe anything that is classifiable within this lexical database 112. A series of nodes $504_1, 504_2, 504_3, \ldots, 504_n, 504_{n+1}, 504_{n+2}, 504_{n+3}$ are at the "lowest" part or the lexical database 112 and are each referred to herein as a "leaf" node (because they have no child nodes). Each of the leaf nodes 504 also have an individual term associated with them, as respectively shown in the illustrated portion "Lion," "Tiger," "Puma," "Domestic dog," "Wolf," "Fox" and "Coyote."

In between the root node 502 and the leaf nodes $504_1, 504_2, 504_3, \ldots, 504_n, 504_{n+1}, 504_{n+2}, 504_{n+3}$ are multiple hypernym nodes 506 that each have a parent node and at least one child node. The hypernym nodes 506 each also have a term associated with them that is more specific than its parent node and more general than any of its child nodes.

Figure 6:
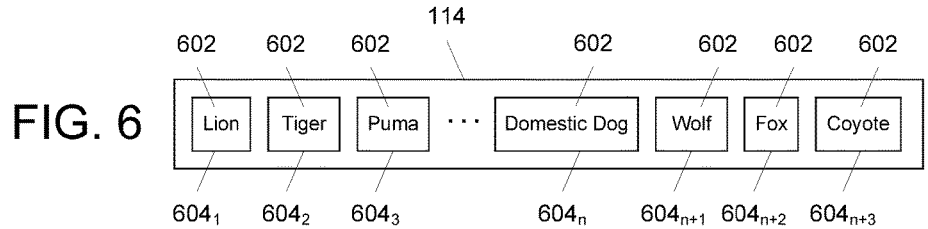
FIG. 6 illustrates, in simplified form, a representative portion of a visual database suitable for use in an image processing system as described herein in conjunction with the lexical database of FIG. 5.

FIG. 6 illustrates, in simplified form, a representative portion of a visual database 114 suitable for use in conjunction with the lexical database 112 of FIG. 5 in an image processing system 100 as described herein. As shown in FIG. 6, the visual database 114 is made up of multiple images 602 that are each tagged or otherwise associated with at least one term, e.g., "Lion" $604_1$, "Tiger" $604_2$, "Puma" $604_3$, . . . , "Domestic dog" $604_n$, "Wolf" $604_{n+1}$, "Fox" $604_{n+2}$, "Coyote" $604_{n+3}$ from the leaf nodes $504_1$, $504_2$, $504_3$, . . . , $504_n$, $504_{n+1}$, $504_{n+2}$, $504_{n+3}$ of the lexical database 112 of FIG. 5.

Figure 7:
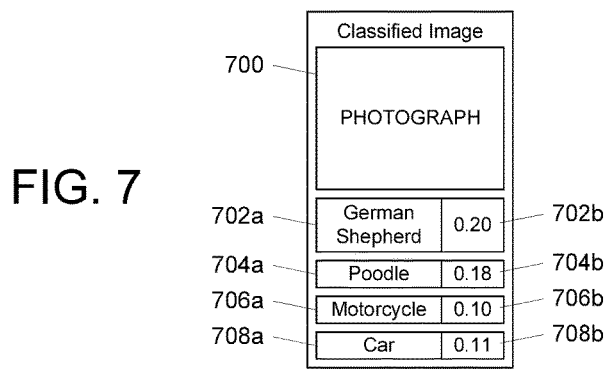
FIG. 7 illustrates, in simplified form, a representative example of the output of an image that has been classified using the image classification software.

FIG. 7 illustrates, in simplified form, a representative example of the output of an image 700 that has been classified using the image classification software 116.

As shown in FIG. 7, the image 700 has associated with it four hyponyms 702a, 704a, 706a, 708a from a lexical database 112 as described herein and their respective probabilities 702b, 704b, 706b, 708b, in this example case, the image 700 has been classified as displaying a: "German Shepherd" with a probability of 0.20, "Poodle" with a probability of 0.18, "Motorcycle" with a probability of 0.10, and "Car" with a probability of 0.11.

Having described various example variant system structures for our processing system 100, the operation of implementations of our solution will now be discussed.

Figure 8:
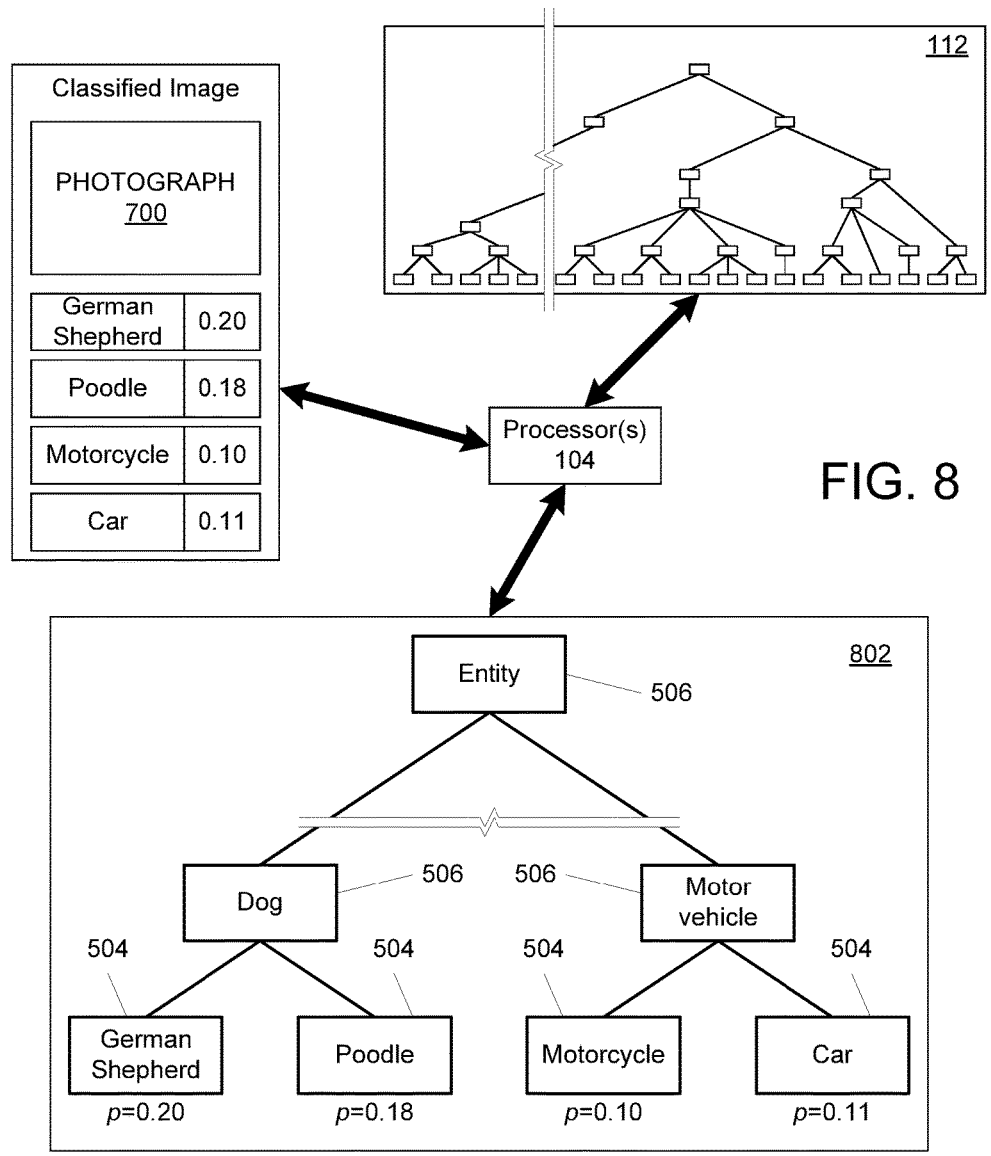
FIG. 8 illustrates, in simplified overview form, the operation of an image processing system to process the classified image of FIG. 7.

FIG. 8 illustrates, in simplified overview form, the operation of an image processing system 100 to process the classified image 700 of FIG. 7.

As shown, under program control, the processor(s) 104 accesses the classified image 700, along with its associated hyponyms 702a, 704a, 706a, 708a and their probabilities 702b, 704b, 706b, 708b in the storage 106.

Next, the processor(s) 104 use the lexical database 112 to build a subset hierarchical tree 802 from it by taking at least the hyponyms 702a, 704a, 706a, 708a and their respective parent, grandparent, great grandparent, etc. nodes 506 from the lexical database 112, and doing so up the hierarchy until either the root node 502 is reached or they all come together at some single hypernym node 506 below the root node 502.

Note here that, optionally, in building the subset hierarchical tree 802, if there are other leaf nodes 504 that share a common parent hypernym node 506 with one of the hyponyms assigned to a classified image, they can be included in the tree built, irrespective of whether they have been assigned a value because, for some implementations, this can yield more accurate results during scoring as described below.

Once the subset hierarchical tree 802 has been built, the processor(s) then use the probabilities 702b, 704b, 706b, 708b to score the hypernym nodes 506 for all immediate parent nodes 506 of the hyponym nodes 506 using a scoring function ("Score(node)").

Depending upon the particular implementation and lexical database, different scoring functions can be used. Equations 1-4 below are a few representative examples of scoring functions that can be used to score the terms for the hypernym nodes 506:

$$\text{Score(node)} = \left[ \frac{[\text{Sum of probabilities of all immediate children}]}{[\log_{10}(\text{minimum distance to a leaf node} + 2) \times \text{(total number of immediate child nodes)}]} \right] \quad \text{(Eq. 1)}$$

$$\text{Score(node)} = \left[ \frac{[\text{Sum of probabilities of all immediate children}]}{[\text{Total number of immediate child nodes}]} \right] \quad \text{(Eq. 2)}$$

$$\text{Score(node)} = [g(\text{node}) \times \log_{10}(\text{sum of } g(\text{node}) \text{ for all images in visual database})] \quad \text{(Eq. 3), and}$$

$$\text{Score(node)} = \left[ \frac{g(\text{node}) \times \log_{10}(\text{popularity of term associated with this node})}{\log_{10}(\text{minimum distance to a leaf node} + 2)} \right] \quad \text{(Eq. 4)}$$

where, in Equation 3 and Equation 4, g(node)=(the average probability of all directly-connected child nodes).

For purposes of the example of FIG. 8, the scoring function of Equation 1 will be used. However, it should be understood that any of the other scoring functions could have been used instead and that different scoring functions may yield better results when used with some specific image classification software 116 and/or lexical database 112.

Referring back to FIG. 8, the score for the hypernym node 506 with the term "Dog" that is the parent to the hyponym leaf nodes for the terms "German Shepherd" and "Poodle" assigned by the image classification software 116 is calculated as:

$$\text{Score(Dog)} = \left[ \frac{[(0.20 + 0.18)]}{[\log_{10}(1+2) \times (2)]} \right] = \left[ \frac{0.38}{\log_{10}(3) \times 2} \right] = 0.398$$

so the probability value of 0.398 is assigned to the hypernym node 506 for the term "Dog."

Likewise, the score for the hypernym node 506 for the term "Motor vehicle" is calculated from the probabilities of the hyponym leaf node terms "Motorcycle" and "Car" assigned by the image classification software 116 as:

$$\text{Score(Motor vehicle)} = \left[ \frac{[(0.10 + 0.11)]}{[\log_{10}(1+2) \times (2)]} \right] = \left[ \frac{0.21}{\log_{10}(3) \times 2} \right] = 0.220$$

and the probability value of 0.22 is assigned to the hypernym node 506 for the term "Motor vehicle."

This process is then repeated for each successively higher hypernym node 506 using the probability values of its respective hypernym children nodes 506 until the score for the highest single common node hypernym node 506 has been calculated or the root node 502 has been reached.

For purposes of this example, presume that the only node above the "Dog" and "Motor vehicle" termed hypernym nodes 506 is the single hypernym node 506 for the term "Entity." Thus, the probability value for that hypernym node 506 can be calculated in a similar fashion as:

$$\text{Score(Entity)} = \left[ \frac{[(0.398 + 0.22)]}{[\log_{10}(2+2) \times (2)]} \right] = \left[ \frac{0.618}{\log_{10}(4) \times 2} \right] = 0.506$$

so the probability value of 0.506 is assigned to the hypernym node 506 for the term "Entity."

Once the scoring of all hypernym nodes 506 in the subset hierarchical tree 802 is complete, the calculated values can be used to identify those one or more hypernyms 506 that best accurately represent the content of the classified image and is not the root node 502 or the highest common ultimate parent node 506. Thus, for the example of FIG. 8, the hypernym node 506 "Dog" represents the least generic hypernym 506 that accurately describes the content of the image 700.

Now, empirically, we have determined that, using our scoring approach, a "Goldilocks" probability range (i.e., one that is not too generic and not too specific) will typically involve calculated score function probability values in the range of 0.30 to 0.40 when GoogLeNet is the image classification software 116 and WordNet is the lexical database 112. However, it is to be understood that other specific combinations of image classification software 116 and lexical database 112 may yield a different "Goldilocks" range that should be readily determinable using known images that are the same as, or close to, one of the images in the visual database 114. Alternatively, depending upon the particular scoring function used, there may not be a need to specify any particular range because: selecting the (non-root) node(s) with the highest score(s) will achieve the same result, irrespective of the actual values for the calculated score(s).

Finally, it is to be understood that, in practice, and depending upon the particular image classification software 116, the subset hierarchical tree 802 may actually be the overall lexical database 112, because some leaf node values may actually be zero or so small as to be effectively zero. Thus, it is to be understood that, as in set theory, where a subset can equal a set, in some cases, the "subset" hierarchical tree 802 may be equal to the entire lexical database 112.

Figure 9:
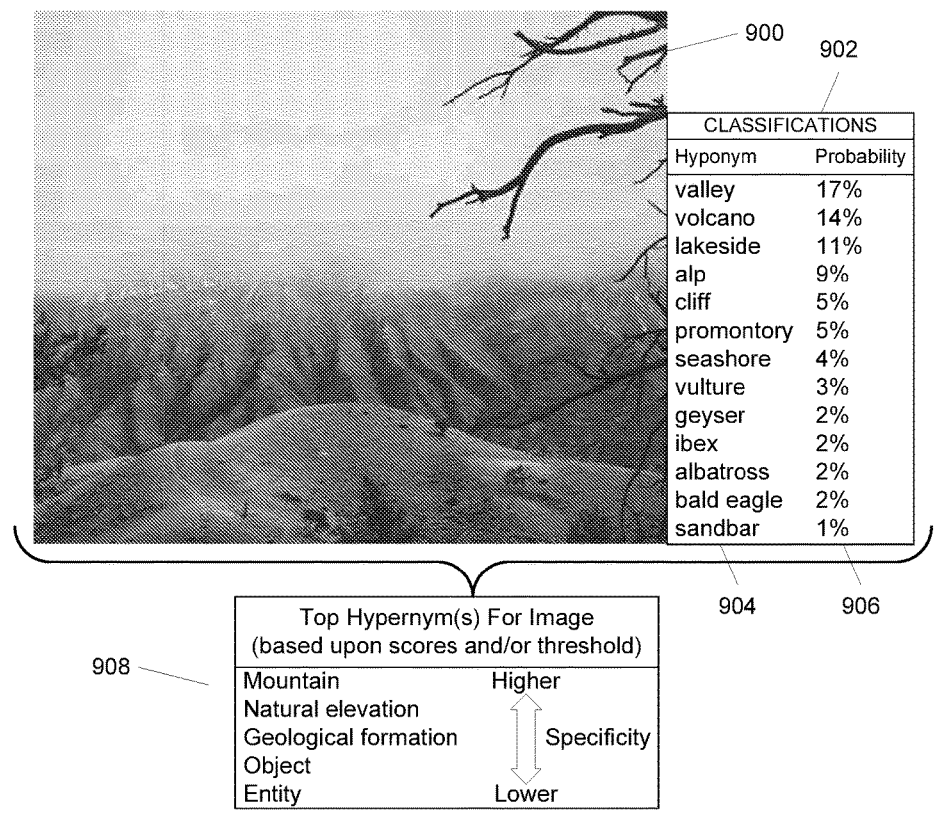
FIG. 9 illustrates, in simplified form, a more concrete example of our solution using WordNet as the lexical database and GoogLeNet as the image classification software.

FIG. 9 illustrates, in simplified form, a more concrete example of our solution using WordNet as the lexical database 112 and GoogLeNet as the image classification software 116.

As shown in FIG. 9, a camera 102 has been used to take a photograph 900 and that photograph has been classified 902 using GoogLeNet to yield a set of thirteen hyponyms 904 that each correspond to a leaf node in the WordNet lexical database 112 and associated probabilities 906 that the individual classification is an accurate description of what appears in the photograph 900.

From those leaf node hyponyms 504, a subset hierarchical tree 802 was created from the WordNet lexical database 112. Following our approach, a probability value for each hypernym node 506 between those leaf nodes 504 and the root node 502 for the term "Entity" is then calculated using a scoring function such as described above in Equations 1 through 4. As a result, based upon the scoring, the top five hypernyms are identified 908. As a result, in order of specificity from most to least, the terms "Mountain," "Natural elevation," "Geological formation," "Object," and "Entity" have been identified. Thus, as should be appreciated, the hypernym "Mountain" is a more accurate description of the image than any of the assigned hyponym terms.

In addition, it should now be appreciated that this improvement to image classification technology can be of significant value in fields relating to identification/discovery/classification of new land and marine creatures. For example, presume that an undersea exploration vehicle takes a photograph of some creature during one of its dives. Using present image classification software, that photograph might be classified with the following hyponyms: "squid," "jellyfish," "octopus," "anemone," "tiger fish" and "seaweed" all with fairly low probabilities (i.e., less than 20%). Thus, it would be difficult, based upon the output of the image classification software to know what is actually displayed, because it may be a new creature that has characteristics of several of those creatures. However, using our approach, the highest scoring hypernym might be "cephalopod." In other words, with our system and approach, the photograph will effectively have been labeled as "this is a photograph that is highly likely to be a cephalopod although we cannot specifically identify it more particularly, so it may be new."

As a result, researchers can better zero in on the photos of creatures of interest so that, a researcher looking for new types of cephalopods would want to examine that photograph (and potentially pictures taken around it), whereas a researcher looking for new types of jellyfish or seaweed would not need to do so, even though the image classification software may have tagged that photograph with those terms (and, hence, would likely have had to have been looked at absent our image processing solution).

Still further, our solution can be extended for use with multiple images collectively so that the collection can be more accurately queried by a user due to the addition, through our solution, of probability values for hypernyms in the associated lexical database. This extended approach will now be described with reference to FIGS. 10-11.

Figure 10:
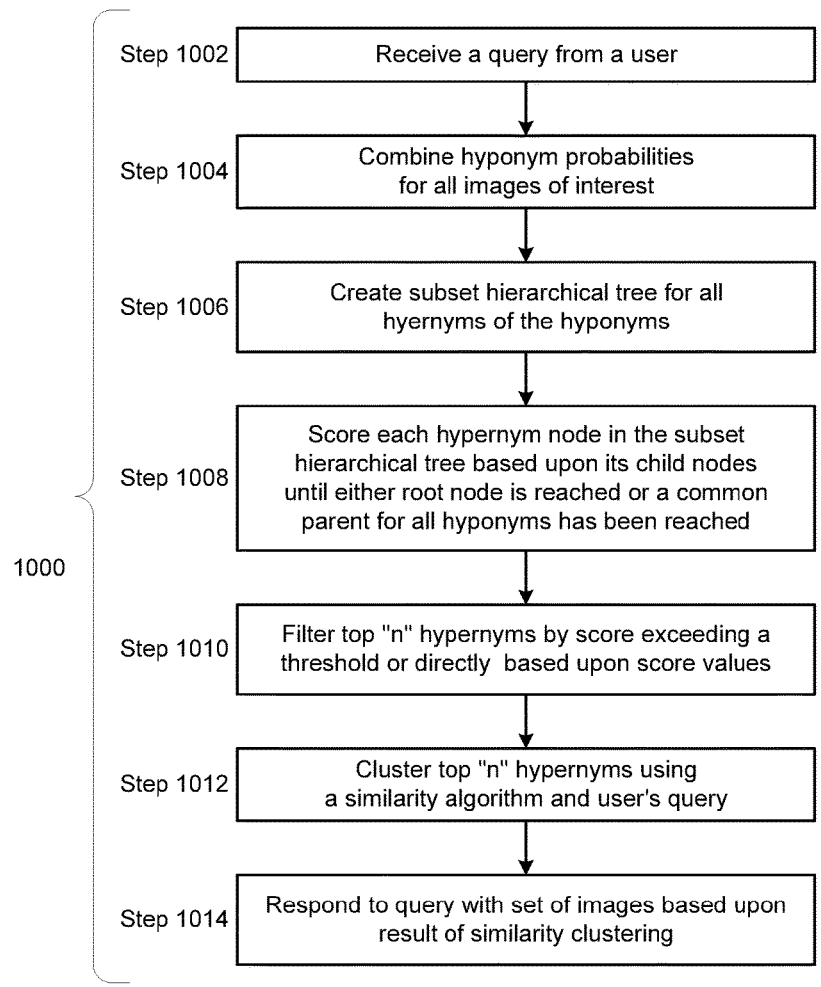
FIG. 10 is a flowchart illustrating, in simplified form, the use of our image processing solution with a collection of images to improve the processing of a user query.

In this regard, FIG. 10 is a flowchart 1000 illustrating, in simplified form, the use of our image processing solution with a collection of classified images to improve the processing of a user query of that collection.

As shown, the process begins with receipt of an image query from a user (Step 1002), for example, in words: "provide all images of otters" or, using an image, a query that is, in effect, return all images most like this image.

In the former case, the term "otters" would have to be a hyponym in the lexical database 112, and in the latter case, the "query" would be based upon the hyponyms assigned by the image classification software 116 to the image that is used as the query. Alternatively, the query could be "all images from user X" or "all images from today's expedition" which could return various sets of images sub-grouped according to their highest scoring non-root node hypernyms.

In either case, at least the images in the collection that satisfy one of those two cases, (e.g., their classifications include the hyponym "otter" or share at least one hyponym with the image that is used as the query) are grouped and the probabilities for those images are combined (Step 1004).

Figure 11:
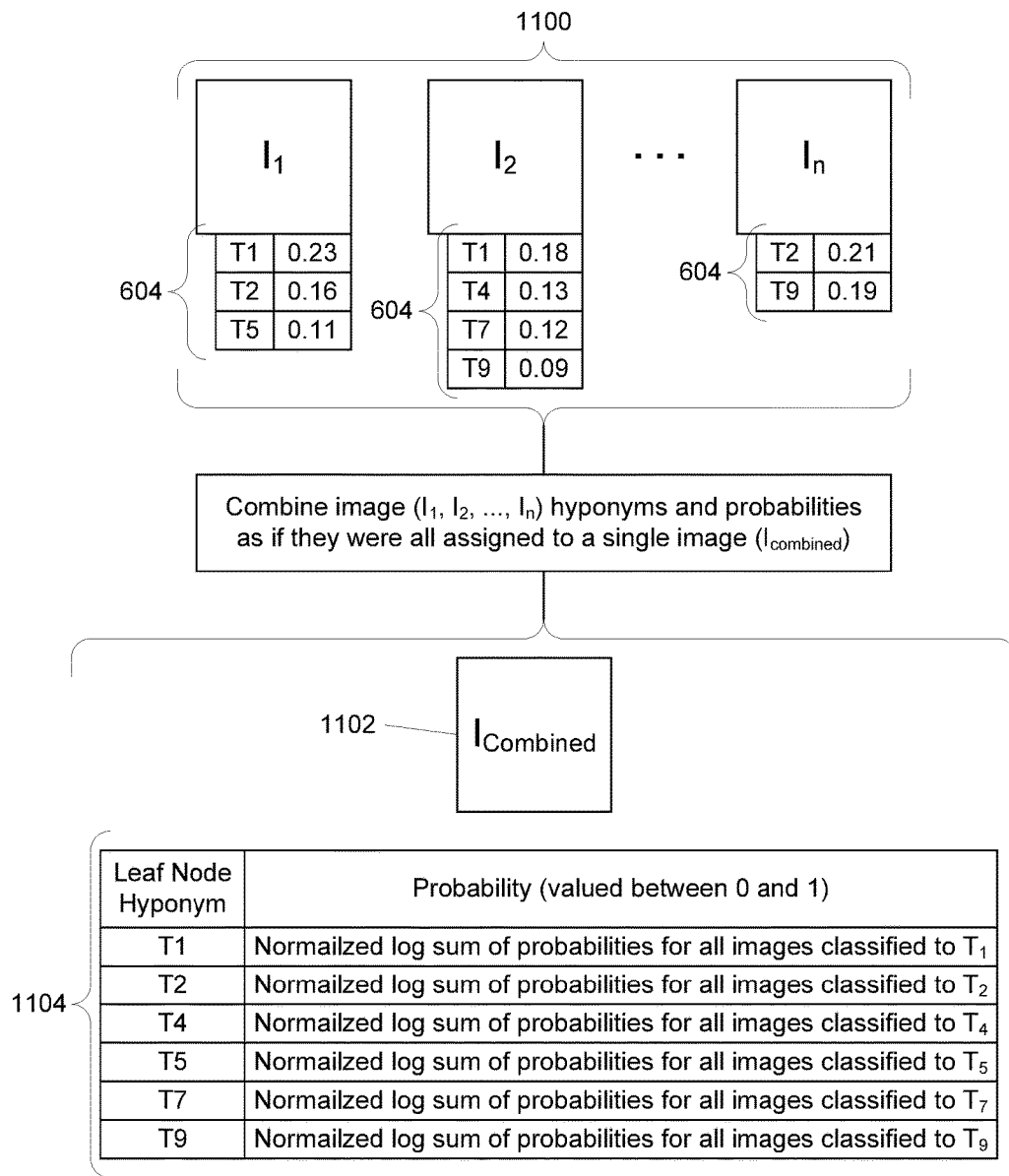
FIG. 11 illustrates, in simplified form, details of how multiple classified images are combined in conjunction with the process of FIG. 10.

FIG. 11 illustrates, in simplified form, details of how multiple classified images are combined in conjunction with the process of FIG. 10.

In FIG. 11, the each image ($I_1, I_2, \ldots, I_n$) in the collection 1100 of classified images has associated hyponym terms 604 and associated probabilities. To combine the images, the unique hyponym terms are collected from all of the relevant images in the collection and their probabilities are combined, on an individual hyponym basis, by taking the log sum of their probabilities for all images classified to that hyponym.

By way of example, in FIG. 11, Image $I_1$ has been classified to hyponym terms T1, T2 and T5, Image $I_2$ has been classified to hyponym terms T1, T4, T7 and T9, and Image $I_n$ has been classified to hyponym terms T2 and T9. So the probability for hyponym term T1 for the collection 1100 would be the log sum of the probabilities for Image $I_1$ and Image $I_2$ and all other images classified to hyponym term T1. Likewise, the probability for hyponym term T2 for the collection 1100 would be the log sum of the probabilities for Image $I_1$ and Image $I_n$ and all other images classified to hyponym term T2, the probability for hyponym term T4 for the collection 1100 would be the log sum of the probabilities for Image $I_2$ and all other images classified to hyponym term T4, and so on.

Once that is done, the result is effectively creation of a classification of a single "image" 1102 (referred to in FIG. 11 as "$I_{combined}$") that has been classified 1104 with all unique hyponym terms of the collection 1100, and, through the probability combination above, now has a single calculated associated probability for each hyponym term based upon the probabilities of the images in the collection that were classified to that term.

Once that is done, the process proceeds largely as described previously for an actual single image but using the terms and probabilities for the "image" $I_{Combined}$, by creating a subset hierarchical tree for all hypernyms of the hyponyms of $I_{combined}$.

Then each hypernym of the subset hierarchical tree is scored using a scoring function as described above (Step 1008).

Once all of the hypernyms of the subset hierarchical tree have been scored, some number "n" of the top hypernyms based directly upon score or based upon exceeding some threshold score value (depending upon the particular implementation) are then filtered (i.e., all other hypernyms are disregarded) (Step 1010).

Then the top "n" hypernyms are clustered, for the images in the collection 1100, using a similarity algorithm and the user's query (Step 1012).

Representative example known similarity algorithms suitable for use in this respect include, but are not limited to, a Leacock-Chodorow similarity algorithm (described in C. Leacock & M. Chodorow, "Combining Local Context and WordNet Similarity for Word Sense Identification," Ch. 11, pp. 265-283. MIT Press, Cambridge, Mass. (1998)), a Wu-Palmer similarity algorithm (described in Z. Wu & M. Palmer, "Verb Semantics and Lexical Selection," 32nd Annual Meeting of the Assoc. for Computational Linguistics, pp. 133-138 (1994)), a Resnik similarity algorithm (described in P. Resnik, "Using Information Content to Evaluate Semantic Similarity in a Taxonomy," Intl Joint Conf. on Artificial Intelligence (IJCAI-95), pp. 448-453, Montreal, Canada (1995)), a Jiang & Conrath similarity algorithm (described in J. Jiang & D. Conrath, "Semantic Similarity Based on Corpus Statistics and Lexical Taxonomy," Proc. of Intl Conf. Research on Computational Linguistics, Taiwan (1997)), a Lin similarity algorithm (described in D. Lin, "An Information-Theoretic Definition of Similarity," Proc. 15th In'l Conf. on Machine Learning, pp. 296-304, San Francisco, Calif. (1998)), or a Nguyen and Al-Mubaid similarity algorithm (described in H. Al-Mubaid & H. A. Nguyen, "A Cross-Cluster Approach for Measuring Semantic Similarity Between Concepts," IEEE Intl Conf. on Information Reuse and Integration, pp. 551-556 (2006)). Of course others can be used.

Finally, the images in the collection 1100 that are identified based upon the result of the similarity clustering are returned to the user as the response to the query (Step 1014). Optionally, depending upon the particular implementation, the "n" hypernyms can also be provided as part of the query response and/or the individual images making up the response can be processed and those hypernyms (either the top hypernyms or those within a "Goldilocks" range—depending upon the scoring function used) can be returned with each image.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

We claim:

1. A method for processing digital images, the method comprising:
   processing, by a computer system, a digital image using a visual database to generate an image classification, the image classification including a first term and an associated probability value indicative of a probability that the first term accurately describes the digital image;
   generating, by the computer system, a subset hierarchical tree based on a lexical database, the subset hierarchical tree including the first term and a plurality of other terms from the lexical database, the first term and plurality of other terms sharing a common parent and arranged in a hierarchy based on specificity;
   calculating, by the computer system, probability values for one or more of the plurality of other terms in the subset hierarchical tree based on the probability value associated with the first term;
   identifying, by the computer system, based on the calculating, a second term from the plurality of other terms that is broader than the first term and that has a calculated probability value that satisfies a specified criterion; and
   generating, by the computer system, an output to a user based on the identified second term.

2. The method of claim 1, wherein the second term is a hypernym indicative of a category that includes the first term as a hyponym.

3. The method of claim 1, wherein the lexical database includes a plurality of nodes representative of terms, the plurality of nodes arranged in a hierarchy based on specificity of the associated terms, the plurality of nodes including:
   a single root node;
   a plurality of hyponym nodes; and
   a plurality of hypernym nodes, each of the plurality of hypernym nodes arranged in the hierarchy between the root node and at least one of the plurality of hyponym nodes.

4. The method of claim 3, wherein:
   the root node is associated with a root term of greatest generality in the hierarchy;
   each of the hyponym nodes is associated with a hyponym term of greatest specificity in the hierarchy; and
   each of the hypernym nodes is associated with a hypernym term that is more specific than terms associated with each of its one or more parent nodes and less specific than terms associated with each of its one or more child nodes.

5. The method of claim 3, wherein the subset hierarchical tree is a subset of the lexical database including a hyponym node associated with the first term, a subset of the plurality hyponym nodes associated with other hyponym terms that share the common parent with the first term, and a subset of the plurality of hypernym nodes associated with hypernym terms within the hierarchy between the subset of the plurality of hyponym nodes and the root node.

6. The method of claim 5, wherein calculating probability values for the plurality of other terms in the subset hierarchical tree includes:

calculating, by the computer system, on a per-node basis, a probability value for a given node in the subset hierarchical tree based on probability values of immediate child nodes to the given node using a specified scoring function.

7. The method of claim 6, wherein the specified scoring function defines the probability value for the given node as based on any of:
- a sum of the probability values of the immediate child nodes;
- a log sum of the probability values of the immediate child nodes;
- an average of the probability values of the immediate child nodes; and/or
- a distance, in the subset hierarchical tree, from the given node to a hyponym node that is a child to the given node.

8. The method of claim 1, wherein the calculated probability value for the second term of the plurality of other terms satisfies the specified criterion if the calculated probability value is greater than:
- a specified threshold probability value; and/or
- all other calculated probability values for terms in the subset hierarchical tree.

9. The method of claim 1, wherein the generated output is in response to a query by the user for a digital image that is associated with the identified second term.

10. A system for processing digital images, the system comprising:
- one or more processors; and
- memory having stored thereon:
  - a lexical database; and
  - instructions, which when executed by the one or more processors, cause the system to:
    - receive an image classification associated with a digital image, the image classification including a first term and an associated probability value indicative of a probability that the first term accurately describes the digital image;
    - generate a subset hierarchical tree using the lexical database, the subset hierarchical tree including the first term and a plurality of other terms from the lexical database, the first term and plurality of other terms sharing a common parent and arranged in a hierarchy based on specificity;
    - calculate probability values for one or more of the plurality of other terms in the subset hierarchical tree based on the probability value associated with the first term;
    - identify, based on the calculating, a second term from the plurality of other terms that is broader than the first term and that has a calculated probability value that satisfies a specified criterion; and
    - generating an output based on the identified second term.

11. The system of claim 10, wherein the lexical database includes a plurality of nodes representative of terms, the plurality of nodes arranged in a hierarchy based on specificity of the associated terms, the plurality of nodes including:
- a single root node;
- a plurality of hyponym nodes; and
- a plurality of hypernym nodes, each of the plurality of hypernym nodes arranged in the hierarchy between the root node and at least one of the plurality of hyponym nodes.

12. The system of claim 11, wherein:
- the root node is associated with a root term of greatest generality in the hierarchy;
- each of the hyponym nodes is associated with a hyponym term of greatest specificity in the hierarchy; and
- each of the hypernym nodes is associated with a hypernym term that is more specific than terms associated with each of its one or more parent nodes and less specific than terms associated with each of its one or more child nodes.

13. The system of claim 11, wherein the subset hierarchical tree is a subset of the lexical database including a hyponym node associated with the first term, a subset of the plurality hyponym nodes associated with other hyponym terms that share the common parent with the first term, and a subset of the plurality of hypernym nodes associated with hypernym terms within the hierarchy between the subset of the plurality of hyponym nodes and the root node.

14. The system of claim 13, wherein calculating probability values for the plurality of other terms in the subset hierarchical tree includes:
- calculating, by the computer system, on a per-node basis, a probability value for a given node in the subset hierarchical tree based on probability values of immediate child nodes to the given node using a specified scoring function.

15. The system of claim 14, wherein the specified scoring function defines the probability value for the given node as based on any of:
- a sum of the probability values of the immediate child nodes;
- a log sum of the probability values of the immediate child nodes;
- an average of the probability values of the immediate child nodes; and/or
- a distance, in the subset hierarchical tree, from the given node to a hyponym node that is a child to the given node.

16. The system of claim 10, wherein the calculated probability value for the second term of the plurality of other terms satisfies the specified criterion if the calculated probability value is greater than:
- a specified threshold probability value; and/or
- all other calculated probability values for terms in the subset hierarchical tree.

17. The system of claim 10, further comprising:
- a camera;
- wherein the digital image is captured by the camera; and
- wherein the memory has further instructions stored thereon, which when executed by the one or more processors, cause the system to further:
  - process the digital image using an image classification algorithm to generate the image classification.

18. The system of claim 10, wherein the one or more processors and memory are housed within an autonomous vehicle.

19. A method for searching a set of digital images, the method comprising:
- receiving, by a computer system, a user query;
- accessing, by the computer system, a plurality of digital images based on the user query, each of the plurality of digital images including a hyponym probability value indicative of a probability that a given hyponym term accurately describes a given digital image;
- generating, by the computer system, a subset hierarchical tree based on a lexical database, the subset hierarchical tree including:

a plurality of hyponym nodes associated with a plurality of hyponym terms of the plurality of digital images; and a plurality of hypernym nodes associated with hypernym terms that are related to the plurality of hyponym terms, each of the plurality of hypernym nodes arranged in the hierarchy between a root node and at least one of the plurality of hyponym nodes;

calculating, by the computer system, on a per node basis, probability values for each hypernym node in the subset hierarchical tree, based on probability values of child nodes to the hypernym node using a specified scoring function;

identifying, by the computer system, based on the calculating, a set of hypernym terms associated with hypernym nodes with probability values that satisfy a specified criterion;

clustering, by the computer system, the set of hypernym terms based on a similarity algorithm and the user search query; and returning, by the computer system, a set of digital images from the accessed plurality of digital images based on a result of the clustering.

20. The method of claim 19, further comprising:

combining the hyponym probability values of each of the accessed plurality of digital images before generating the subset hierarchical tree.

21. The method of claim 20, wherein combining the hyponym probability values of each of the accessed plurality of digital images includes calculating a normalized log sum of the hyponym probability values for each hyponym term occurring in the accessed plurality of digital images.

22. The method of claim 20, wherein the specified scoring function defines the probability value for a given node in the subset hierarchical tree as based on any of:

a sum of the probability values of immediate child nodes to the given node;

a log sum of the probability values of the immediate child nodes to the given node;

an average of the probability values of the immediate child nodes to the given node; and/or a distance, in the subset hierarchical tree, from the given node to a hyponym node that is a child to the given node.

23. The method of claim 20, wherein the probability value of a given hypernym node satisfies the specified criterion if the probability value is greater than:

a specified threshold probability value; and/or probability values of all of a specified percentage of other hypernym nodes in the subset hierarchical tree.

* * * * *

UNITED STATES PATENT AND TRADEMARK OFFICE
CERTIFICATE OF CORRECTION

PATENT NO. : 10,007,864 B1
APPLICATION NO. : 15/891969
DATED : June 26, 2018
INVENTOR(S) : Micha Gorelick et al.

It is certified that error appears in the above-identified patent and that said Letters Patent is hereby corrected as shown below:

On the Title Page

Under "(*) Notice", in Column 1, Line 3, after "0 days." delete "days.".

In the Drawings

On sheet 8 of 9, in FIG. 10, reference numeral 1006, Line 2, delete "hyernyms" and insert -- hypernyms --, therefor.

On sheet 9 of 9, in FIG. 11, reference numeral 1104, Line 3, delete "Normailzed" and insert -- Normalized --, therefor.

On sheet 9 of 9, in FIG. 11, reference numeral 1104, Line 4, delete "Normailzed" and insert -- Normalized --, therefor.

On sheet 9 of 9, in FIG. 11, reference numeral 1104, Line 5, delete "Normailzed" and insert -- Normalized --, therefor.

On sheet 9 of 9, in FIG. 11, reference numeral 1104, Line 6, delete "Normailzed" and insert -- Normalized --, therefor.

On sheet 9 of 9, in FIG. 11, reference numeral 1104, Line 7, delete "Normailzed" and insert -- Normalized --, therefor.

On sheet 9 of 9, in FIG. 11, reference numeral 1104, Line 8, delete "Normailzed" and insert -- Normalized --, therefor.

Signed and Sealed this
Twentieth Day of November, 2018

Andrei Iancu
*Director of the United States Patent and Trademark Office*